Feb. 14, 1956 H. HOFFMANN 2,734,491
PRECHAMBER COMPRESSION IGNITION ENGINE
Filed Nov. 29, 1950
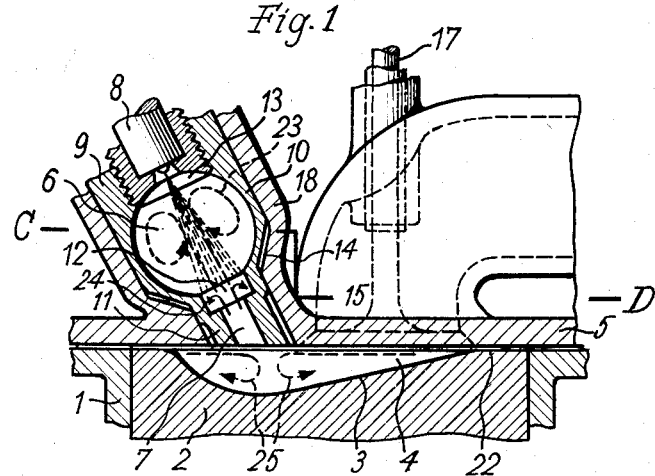
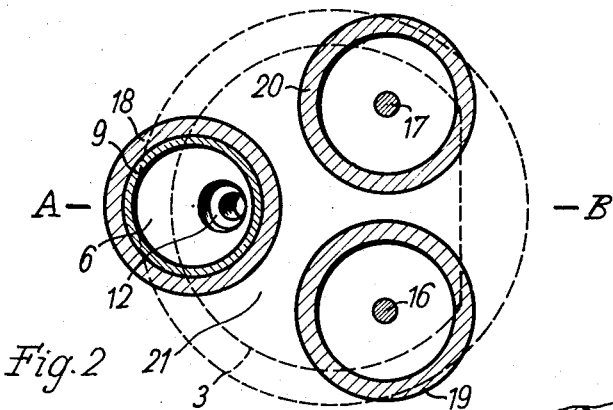
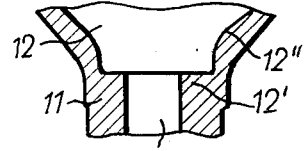
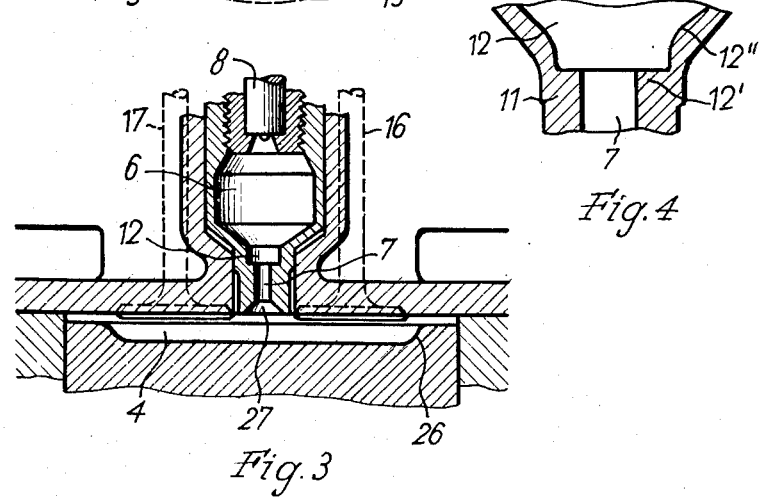

United States Patent Office 2,734,491
Patented Feb. 14, 1956

2,734,491

PRECHAMBER COMPRESSION IGNITION ENGINE

Heinrich Hoffmann, Stuttgart-Bad Cannstatt, Germany, assignor to Daimler-Benz Aktiengesellschaft, Stuttgart-Unterturkheim, Germany Application November 29, 1950, Serial No. 198,196

Claims priority, application Germany December 28, 1949

5 Claims. (Cl. 123—32)

This invention relates to a prechamber compression ignition engine and more particularly to such type of engine having a compact, substantially spherical prechamber connected to the main combustion chamber by a central communicating passageway arranged in the direction of the axis of the injected fuel jet.

A primary object of the invention is to provide improved combustion properties, low heat losses of the charge during compression and combustion and as low a fuel consumption as possible.

A further object of the invention has reference to a design of the chamber such that the favorable properties of the engine are obtained with the simplest possible means, in particular also with a prechamber having a shape that can be manufactured in the simplest possible manner.

Accordingly, one feature of the invention consists in that, preferably within an insert member lining the prechamber and the passageway and restraining heat dissipation, the passageway is provided with a stepped enlargement at its discharge end into the prechamber taking up the fuel jet and forming a sharp-edged shoulder with the passageway, and in that the main combustion chamber is formed by a recess in the piston head, said passageway discharging into the piston recess in such a manner that the contents of the prechamber are blown out into the compressed air displaced by the unrecessed piston rim towards the discharge orifice of the prechamber approximately in the direction of the swirl axis of the compressed air. According to a further feature of the invention the passageway comprises, for instance, a conical or nozzle-shaped enlargement at its discharge orifice into the main combustion chamber.

According to a further feature of the invention the prechamber and the passageway are lined, for instance, by a single-piece insert member which has a smaller wall thickness at the periphery of the prechamber than in the lower cylindrical portion containing the passageway and the stepped enlargement and which is insulated particularly at or adjacent the stepped enlargement from the cylinder head wall.

A still further feature of the invention is the provision of a prechamber which has the shape of a body of revolution about the axis of the passageway with reduced axial ends either in the form of a double cone, i. e. cylindrical in its central portion and conical at its ends, or of generally spherical form.

In a prechamber compression ignition engine presenting the aforementioned features a particularly low fuel consumption can be obtained. The spherical or otherwise compact shape of the prechamber provided, in particular, within the insert member, on the one hand and the formation of a main combustion chamber by a recess in the piston head, on the other hand result in a favorable heat retention of the compressed air contained in the main combustion chamber as well as that passing into the prechamber. Such type of engine provides, in particular if the prechamber contents are blown out into the meeting point of the air radially displaced by the unrecessed piston rim into the piston recess, a low fuel consumption and nevertheless a high power output.

The combustion properties of the engine are influenced in a particularly favorable manner, above all with respect to fuel consumption and smoke limit, in that according to an essential feature of the invention the passageway does not discharge immediately into the prechamber but with a stepped enlargement forming a sharp-edged shoulder with the passageway. This favorable result is apparently due to the fact that the air leaving the cylinder space separates from the wall at the discharge edge between passageway and enlargement under formation of local swirls and of an efficient mixture with the fuel sprayed into said swirls, whereby in connection with the main swirl formed in the prechamber a particularly perfect mixture of air and fuel is obtained. The separation of the air flow from the wall of the passage simultaneously provides a reduced heat and friction loss of the air stream which, in particular in connection with the insert member restraining the heat transfer, has as a consequence a further improvement of the thermal efficiency. If thereupon the prechamber mixture advantageously prepared in the manner described is blown into the hot compressed air within the piston recess screened by the piston rim against premature cooling down, an efficient mixing is achieved of the unburnt and incompletely burnt fuel which is still present in the prechamber owing to the excess fuel with the compressed air in the main combustion chamber.

It has further been discovered that inasmuch as a prechamber constructed and shaped in the form of a double cone approximates a spherical prechamber with respect to the internal space thereof, practically the same favorable results may be obtained with a prechamber shaped in the form of a double cone as with an exactly spherical prechamber. The particular construction and shape of the prechamber in the form of a double cone has in addition the advantage that it facilitates manufacture.

In the accompanying drawings are shown two embodiments of the invention in diagrammatic form.

Fig. 1 shows a vertical section through the axes of prechamber and cylinder along the line A—B of Fig. 2;

Fig. 2 shows a horizontal section along the line C—D of Fig. 1;

Fig. 3 shows a somewhat modified design and arrangement of prechamber and passageway respectively;

Fig. 4 shows on an enlarged scale the enlargement of the passageway.

In the drawings there is shown a water-cooled cylinder 1 with a piston 2 for reciprocation therein which is provided with a recess 3 in the piston head forming the main combustion chamber 4 in the upper dead center of the piston. The water-cooled cylinder head 5 includes a prechamber 6 which is in communication with the main combustion chamber through a passageway 7 and into which the fuel is injected by an injection nozzle 8 arranged axially with relation to the passageway 7. Prechamber and passageway 7 are formed by an insert member 9 having around the prechamber such as at 10 a comparatively small wall thickness and in the lower cylindrical portion 11 containing the connecting passage a comparatively great wall thickness.

According to the invention the prechamber 6 does not discharge immediately into the passageway but into a dish- or bowl-shaped enlargement 12 which conveniently forms a sharp edge 12' by the intersection of essentially 90 degrees of the bottom surface thereof and the walls forming the passageway 7 and which is directed towards the fuel jet 13 issuing from the nozzle 8. The diameter of the enlargement is, for instance, once or one and a half times the diameter of the passageway, while the cross section of the passageway 7 is sufficiently large to permit a direct injection of fuel from the nozzle 8 into the main combustion chamber 4 during starting of the engine when the temperature in the main combustion chamber is higher than in the prechamber thereby facilitating starting of the cold engine. The peripheral wall of the enlargement has conveniently a rounded transition 12'' to the wall of the prechamber. In the vicinity of this enlargement 12 the prechamber insert 9 is further insulated from the cylinder head wall by an insulating space 14. A further insulating gap 15 separates the lower cylindrical portion 11 of the insert member from the surrounding cylinder head wall.

In the embodiment illustrated in Figs. 1 and 2 the prechamber is of spherical design and arranged slantingly with respect to the cylinder axis and adjacent an inlet valve 16 and an outlet valve 17 such that between the walls 18 of the prechamber and the walls 19 and 20 respectively of the inlet and outlet walls free passages 21 for the cooling water may be provided. The piston recess 3 forming the main combustion chamber 4 is designed in the form of a spoon such that it has its greatest depth below the discharge end of the passageway 7 flattening out at the side opposite the prechamber into the unrecessed piston rim 22 which in the upper dead center of the piston closely approaches the cylinder head end wall.

The mode of operation of the engine is as follows: The up-stroke of the piston forces the compressed air through the passageway 7 into the prechamber thereby initiating in the prechamber a swirl motion substantially in the direction of the arrows 23. At the same time additional local swirls 24 are produced in the enlargement 12 owing to the sudden separation of the entering air at the edge of the enlargement. The fuel injected in the jet 13 against the enlargement 12 is accordingly subjected to an additional swirl motion and mixture at the transition between passageway and prechamber. On the other hand a swirl motion is produced in the main combustion chamber 4 upon the piston approaching the upper dead center such as indicated by the arrows 25, the displacement streams produced by the piston rim meeting approximately near the discharge end of the passageway 7 into the main combustion chamber and being deflected into the piston recess. The prechamber mixture which is discharged at that moment after the occurrence of the prechamber ignition is blown by the forces of the prechamber ignition into these airstreams which deflect each other and is thereby distributed in a very efficient manner over the main combustion chamber. The screening unrecessed piston rim insures in this case a favorable heat retention in the main combustion chamber in particular until the fuel mixture has been completely burnt.

In the embodiment illustrated in Fig. 3 the prechamber 6 is arranged in the direction of the axis of the cylinder, for instance, centrally between two inlet valves 16 and two outlet valves 17 each in the cylinder head. Accordingly the main combustion chamber 4 is arranged symmetrically with relation to the cylinder axis, for instance, with a circular limitation wall 26 in the piston head. The passageway 7 discharges in this case, for instance, with a conical enlargement 27 into the main combustion chamber. Furthermore the prechamber 6 is not exactly spherical but in its central portion cylindrical and at its ends adjacent the injection nozzle 8 and adjacent the stepped enlargement 12 of the passageway respectively substantially cone-shaped. Otherwise, the mode of operation of the engine as illustrated in Fig. 3 is substantially the same as that of the engine designed in conformity with Figs. 1 and 2.

While this description has reference to particular forms of the invention it will be obvious that various other forms and modifications may be resorted to without departing from the scope of the invention.

What is claimed is:

1. A prechamber compression ignition engine comprising a cylinder space, a piston reciprocating space, a main combustion chamber defined by a recess in the head of the piston and by a non-recessed marginal portion of the piston, a cylinder head including a cooling water jacket and a bottom wall closing the cylinder space and cooperating with the marginal portion of the piston in the upper dead center position thereof to direct toward said first-mentioned recess any gases normally positioned peripherally of the cylinder space, a recess in the cylinder head, an insert in the second-mentioned recess defining a substantially spherical prechamber, an injection nozzle opening into said prechamber having its longitudinal axis directed substantially through the center of the prechamber, a substantially cylindrical communicating passageway coaxial with the axis of said nozzle and of greater length than diameter positioned between said prechamber and said main combustion chamber, said passageway opening into said first-mentioned recess defining said main combustion chamber in the direction of the piston head and terminating substantially in the plane of the cylinder head bottom wall to thereby leave unobstructed the full depth of said main combustion chamber, and an abruptly stepped substantially cylindrical enlargement coaxial with said passageway and directly communicating with said prechamber, said enlargement defining a sharp edge by the intersection of essentially 90 degrees of the bottom surface thereof and the walls forming said communicating passageway, the diameter of said enlargement being greater than the axial length thereof, and the cross section of said passageway being of sufficient size to permit direct injection of a substantial portion of the injected fuel from the nozzle into said main combustion chamber.

2. A prechamber compression ignition engine as in claim 1, wherein the recess defining the main combustion chamber and the prechamber are positioned eccentrically of the cylinder axis to the same side thereof, and wherein the injection nozzle and the passageway are so inclined downwardly toward the cylinder axis that the passageway opens out into a median portion of the eccentric main combustion chamber eccentrically of the cylinder axis.

3. A prechamber compression ignition engine according to claim 1, wherein said stepped enlargement is shaped in the form of a cylindrical bowl with a diameter of at least twice the diameter of said passageway.

4. A prechamber compression ignition engine according to claim 1, wherein said stepped enlargement is shaped in the form of a cylindrical bowl and has rounded portions at the points of transition into the walls of said prechamber.

5. A prechamber compression ignition engine according to claim 1 wherein said insert member is a single-piece insert member containing said prechamber and said passageway and having a smaller wall thickness along the periphery of said prechamber than in the cylindrical portion of smaller diameter containing said passageway and said stepped enlargement, said single-piece insert member defining hollow insulating spaces from the cylinder head wall in the vicinity of said stepped enlargement.

References Cited in the file of this patent

UNITED STATES PATENTS

| | | |
|---|---|---|
| 1,579,351 | Eltze | Apr. 6, 1926 |
| 1,912,057 | Bagnulo | May 30, 1933 |
| 2,075,911 | Roth | Apr. 6, 1937 |
| 2,316,269 | Maruhn | Apr. 13, 1943 |
| 2,381,423 | Buck | Aug. 7, 1945 |
| 2,402,213 | Starr | June 18, 1946 |
| 2,560,799 | Johnson | July 17, 1951 |

FOREIGN PATENTS

| | | |
|---|---|---|
| 741,540 | France | Feb. 13, 1933 |
| 527,095 | Great Britain | Oct. 2, 1940 |

OTHER REFERENCES

Ser. No. 368,293, Von Mallinckrodt (A. P. C.), published May 11, 1943.